United States Patent
Ohyama et al.

(10) Patent No.: US 7,133,567 B2
(45) Date of Patent: Nov. 7, 2006

(54) IMAGE CODING APPARATUS AND IMAGE CODING METHOD

(75) Inventors: Tatsushi Ohyama, Gifu (JP); Yuji Yamada, Gifu (JP); Hideki Yamauchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 918 days.

(21) Appl. No.: 10/193,619

(22) Filed: Jul. 10, 2002

(65) Prior Publication Data

US 2003/0035476 A1 Feb. 20, 2003

(30) Foreign Application Priority Data

Jul. 12, 2001 (JP) .............................. 2001-212919

(51) Int. Cl.
*G06K 9/46* (2006.01)

(52) U.S. Cl. ...................................... 382/246; 382/232

(58) Field of Classification Search ................ 382/240, 382/232–233, 248, 250, 247, 234, 302–304; 375/240.11, 240.14, 240.18–240.21, 240.24; 709/247; 358/426.01–426.16; 341/60, 63, 341/67, 51, 95, 107

See application file for complete search history.

(56) References Cited

U.S. PATENT DOCUMENTS 6,501,397 B1 * 12/2002 Radha et al. ................. 341/60
6,859,563 B1 * 2/2005 Schwartz et al. ........... 382/247
6,983,075 B1 * 1/2006 Schwartz et al. ........... 382/251

FOREIGN PATENT DOCUMENTS

| CN | 1406431 A | 3/2003 |
| JP | 06-268872 | 9/1994 |
| JP | 2003-8906 | 1/2003 |
| WO | WO 01/20897 A1 | 3/2001 |

OTHER PUBLICATIONS

Notification of Reason(s) for Refusal in corresponding Japanese Patent Application No. JP 2001-212919, mailed Sep. 27, 2005, with English translation.
Notice on Office Action in corresponding Chinese Patent Application No. 02126405.8 mailed on Dec. 31, 2004 together with English translation.

* cited by examiner

*Primary Examiner*—Ishrat Sherali
(74) *Attorney, Agent, or Firm*—McDermott Will & Emery LLP

(57) ABSTRACT

A bit-plane processor reads out a code block, which serves as a unit for arithmetic coding, from an SRAM. After converting the code block to the form of a bit-plane, the bit-plane processor supplies bit data to a pass processor. The pass processor includes an s pass processor, an r pass processor and a c pass processor. Each of s pass, r pass and c pass processings are executed in parallel in a state such that start time thereof is shifted by a predetermined unit time by operation of two delay units.

11 Claims, 11 Drawing Sheets

FIG.2

| D0 | D1 | D2 |
|----|----|----|
| D3 | X  | D4 |
| D5 | D6 | D7 |

FIG.3

| (0,0)  | (0,1)  | · | · | · | · | (0,30)  | (0,31)  |
|--------|--------|---|---|---|---|---------|---------|
| (1,0)  | (1,1)  | · | · | · | · | (1,30)  | (1,31)  |
| ·      | ·      | · | · | · | · | ·       | ·       |
| ·      | ·      | · | · | · | · | ·       | ·       |
| ·      | ·      | · | · | · | · | ·       | ·       |
| (30,0) | (30,1) | · | · | · | · | (30,30) | (30,31) |
| (31,0) | (31,1) | · | · | · | · | (31,30) | (31,31) |

IMAGE CODING APPARATUS AND IMAGE CODING METHOD

BACKGROUND OF THE INVENTION

1. Field of the Invention

The present invention relates to an image coding technology, and it particularly relates to method and apparatus for performing arithmetic coding on image data.

2. Description of the Related Art

In the twentieth century, which was often called "The Century of Images", a great variety of pictures and images were produced and put to use in movies, television broadcasts and so forth. During the 1990's in particular, the widespread use of PCs (personal computers) and other information equipment, the popularization of digital cameras, color printers and so forth and the explosive increase in the use of the Internet accounted for deep infiltration of the culture of digital images into everyday life of ordinary people. Under these circumstances, coding and compression technologies, such as JPEG (Joint Photographic Expert Group) for static images and MPEG (Motion Picture Expert Group) for moving images, have been standardized so as to improve the facility of distribution and reproduction of the images through recording media, such as CD-ROMs, and transmission media, such as networks and broadcasting waves.

As demand for higher image quality grew and related technologies advanced to meet it, there have also been growing needs for new coding technologies. It has been some time since the work on JPEG2000, which is an advanced version in the JPEG series, was initiated, and as a result the specifications have been standardized and their practical applications have started.

The coding algorithm of JPEG2000 not only involves complex processing, such as wavelet transform and bit-plane entropy coding, but also places heavy loads on the CPU and uses much memory capacity. Thus, a strategic design policy is required if the specifications of JPEG2000 are to be realized efficiently.

A naive design of a coding algorithm in accordance with the specifications may produce a hardware structure overloading the CPU, too large a memory capacity required or other problems. Particularly when it is to be mounted on small electronic devices, such as digital cameras or portable telephones, which are subject to limitations on battery capacity, some ingenious schemes are required to hold down power consumption and memory capacity at a low level.

SUMMARY OF THE INVENTION

The present invention has been made based on these considerations, and an object thereof is to provide an image coding technology which is advantageous in terms of computation time and memory capacity.

A preferred embodiment according to the present invention relates to an image coding apparatus. This apparatus includes: a plurality of bit-plane units which read out image data by slicing the image data for each bit-plane; and a plurality of coders which independently code data of respective bit-planes thus read out by the plurality of bit-plane units.

Another preferred embodiment according to the present invention relates also to an image coding apparatus. This apparatus comprises: a converter which converts image data to data on a spatial frequency; a quantizer which quantizes data that have been converted by the converter; a plurality of bit-plane units which read out data that have been quantized by the quantizer, by slicing the quantized data for each bit-plane; a plurality of coders which independently code data of respective bit-panes thus read out; and a stream generator which integrates data of respective bit-planes that have been coded by the coders, so as to generate a coded stream, wherein coding of the respective bit-plane data is executed in parallel.

Still another preferred embodiment according to the present invention relates also to an image coding apparatus. This apparatus includes: a plurality of bit-plane units which read out image data by slicing the image data for each bit-plane; a dividing unit which divides data of each bitplane read out by the bit-plane unit, into a plurality of groups according to predetermined properties; and a plurality of coders which independently code data of respective groups of each bit-pane.

Still another preferred embodiment according to the present invention relates also to an image coding apparatus. This apparatus comprises: a converter which converts image data to data on a spatial frequency; a quantizer which quantizes data that have been converted by the converter; a plurality of bit-plane units which read out data that have been quantized by the quantizer, by slicing the quantized data for each bit-plane; a dividing unit which divides data of each bit-plane read out by the bit-plane unit, into a plurality of groups according to predetermined properties; and a plurality of coders which independently code data of respective groups of each bit-plane; and a stream generator which integrates data of respective bit-planes that have been coded by the coders, so as to generate a coded stream, wherein coding of data of the respective groups for each bit-plane is executed in parallel.

Still another preferred embodiment according to the present invention relates also to an image coding apparatus. This apparatus includes: a single bit-plane unit which reads out image data by slicing the image data for each bit-plane; a plurality of special-purpose dividing units which classify bit-plane data read out by the bit-plane unit into different groups that the dividing units take charge of, according to predetermined properties, and then perform thereon preprocessings for coding; and a coder which integrates data obtained as results of the preprocessings by the plurality of special-purpose dividing units and then codes the integrated data.

These special-purpose dividing units are, for example in JPEG200, special-purpose dividing units which divide data into three respective passes of s pass (significance pass), r pass (refinement pass) and c pass (cleanup pass), and processing operations of these special-purpose dividing units may be parallelized. In that case, results of pass processings in a bit-plane of high-order bit may be referred to at the time of a pass processing in a bit-plane of low-order bit. The preprocessings by the plurality of special-purpose dividing units may be executed in parallel while a time lag is kept to a degree that cross-referencing necessary among the results of the preprocessings is made. For example, this cross-referencing may be one-direction referencing such that a processing result of the s pass is referred to in the r pass processing and a processing result of the r pass is referred to in the c pass processing.

Moreover, the preprocessing is a processing which specifies a coding condition of a next bit to be coded, and the coder may perform arithmetic coding on the image data based on the coding condition. On that occasion, a context defined in JPEG2000 specifications may be formed and referred to at the time of arithmetic coding.

Still another preferred embodiment according to the present invention relates also to an image coding apparatus. This apparatus comprises: a converter which converts image data to data on a spatial frequency; a quantizer which quantizes data that have been converted by the converter; a bit-plane unit which reads out data that have been quantized by the quantizer, by slicing the quantized data for each bit-plane; a plurality of special-purpose dividing units which classify bit-plane data read out by the bit-plane unit, into different groups that the dividing units take charge of, according to predetermined properties, and then perform thereon preprocessings for coding; a coder which integrates data obtained as results of the preprocessings by said plurality of special-purpose dividing units and then codes the integrated data; and a stream generator which integrates data that have been coded by the coder, so as to generate a coded stream. The plurality of special-purpose dividing units may divide, in parallel, the respective bit plane data into data of different passes in compliance with JPEG2000 specifications.

The plurality of special-purpose dividing units may include at least first and second special-purpose dividing units which take charge of first and second groups, respectively, and data of each bit-plane may be processed in a manner that at a first-time scan operation the first group is first extracted by the first special-purpose dividing unit, and, at a second-time scan operation, data judged not to belong to the first group by the first special-purpose dividing unit are inputted to the second especial-purpose dividing unit and the second group is extracted. The first and second special-purpose dividing units may extract data of different passes from the data of each bit-plane in compliance with JPEG2000 specifications, and a processing of the second special-purpose dividing unit may be started as soon as a result of a processing of the first special-purpose dividing unit is taken over to the second special-purpose dividing unit.

Moreover, the plurality of special-purpose dividing units may include at least first and second special-purpose dividing units which take charge of first and second groups, respectively, and data of each bit-plane may be processed in a manner that at a first-time scan operation the first group is first extracted by the first special-purpose dividing unit, and at the same time a data position of at least the first group is recorded and at a second-time scan operation the second special-purpose dividing unit extracts the second group by referring to the recorded data.

Still another preferred embodiment according to the present invention relates to an image coding method. This method comprises: converting image data to data on spatial frequency; quantizing data that have been converted by the converting; reading out data that have been quantized by the quantizing, by slicing the qunatized data for each bitplane; coding data of respective bit planes thus read out by said reading, independently and in parallel; and integrating data of respective bit-planes that have been coded by the coding, and generating a coded stream.

Still another preferred embodiment according to the present invention relates also to an image coding method. This method comprises: reading out image data, in parallel, by slicing the image data for each bit-plane; dividing each bit-plane data read out by the reading, into a plurality of groups according to predetermined properties; and coding data of respective groups of each bit-plane, independently and in parallel.

Still another preferred embodiment according to the present invention relates also to an image coding method. This method comprises: converting image data to data on a spatial frequency; quantizing data that have been converted by said converting; reading out, in parallel, data that have been quantized by said quantizing, by slicing the quantized data for each bit-plane; dividing each bit-plane data, read out by said reading, into a plurality of groups according to predetermined properties; coding data of respective groups of each bit-plane, independently and in parallel; and integrating data of respective bit-planes that have been coded by said coding, and generating a coded stream.

Still another preferred embodiment according to the present invention relates also to an image coding method. This method comprises: reading out image data, in sequence, by slicing the image data for each bit-plane; classifying bit-plane data, read out by said reading, into different groups according to predetermined properties and then performing, in parallel, preprocessings for coding on the groups; and integrating data obtained as results of the preprocessings and then coding the integrated data.

In the performing the preprocessings, a first group may be extracted by a first-time scan operation for bitplane data thus read out so as to be processed, and a second group may be extracted, from data judged not to belong to the first group, by a second-time scan operation, so as to be processed.

Moreover, in the performing the preprocessings, data of different passes may be extracted in sequence from each bit-plane data in compliance with JPEG2000 specifications, and as soon as a result of a processing of a previous pass extracted is taken over to a processing of a next pass, the processing of the next pass may be started.

It is to be noted that any arbitrary replacement or conversion of the above-described structural components and the steps, expressions replaced or converted in part or whole between a method and an apparatus as well as addition thereof, and expressions changed to a computer program, recording medium or the like are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 2 illustrates surrounding neighbor coefficients used in arithmetic coding of a bit-plane by the arithmetic coder shown in FIG. 1.

FIG. 3 illustrates a code block which serves as a unit of the arithmetic coding.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

The preferred embodiments relates to image coding that utilizes JPEG2000 as a form of image processing. Hereinbelow, no detailed description will be given of JPEG2000 whose outline is known widely.

First Embodiment

Figure 1:
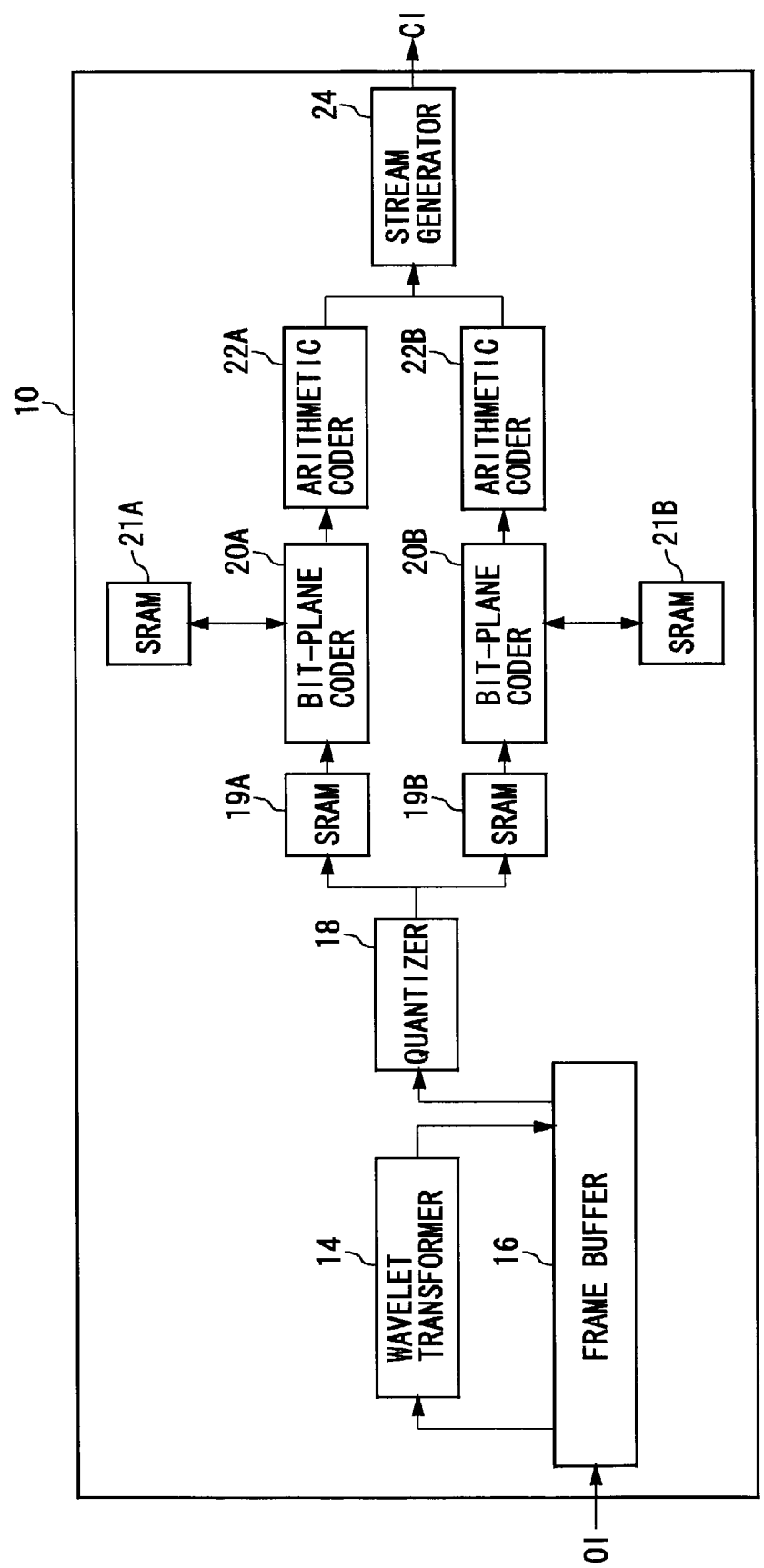
FIG. 1 is a block diagram showing a structure of an image coding apparatus according to a first embodiment of the present invention.

FIG. 1 shows a structure of an image coding apparatus 10 according to a first embodiment of the present invention. In terms of hardware, this structure can be realized by a CPU, memory and other LSIs. In terms of software, it is realized by memory-loaded programs or the like with image coding functions. Described and shown here are functional blocks that are realized in cooperation with such components. Therefore, it should be understood by those skilled in the art that these functions can be realized in a variety of forms by hardware only, software only or by the combination thereof.

The image coding apparatus 10 includes a wavelet transformer 14, a frame buffer 16, a quantizer 18, bit-plane coders 20A and 20B, arithmetic coders 22A and 22B and a stream generator 24. At the start of a coding processing, an input image is divided into a plurality of blocks called tiles. Each tile is coded as an independent image, and a bit stream is formed. Thus, an image block corresponding to this tile will be treated as an original image (OI) hereinbelow. It is to be noted, however, that the input image, as it is kept intact, may also be processed as an original image OI without being divided into tiles.

First, an original image OI is read into the frame buffer 16. The wavelet transformer 14 reads out the original image OI from the frame buffer 16 and transforms the image recursively by a wavelet transform. JPEG2000 utilizes Daubechies filters for the wavelet transform. This filter operates as a low-pass filter and a high-pass filter in each of the vertical and horizontal directions of an image and divides a single image into four frequency subbands. These subbands are an LL subband, which has low-frequency components in both vertical and horizontal directions, an HL subband and an LH subband, which have a low-frequency component in one of the vertical and horizontal directions and a high-frequency component in the other, and an HH subband, which has high-frequency components in both vertical and horizontal directions. The number of pixels in the vertical and horizontal directions of each subband is ½ of that of the image before the processing, and one time of filtering produces subband images whose resolution, or image size, is ¼ of the original image. The subband images thus obtained are stored in the frame buffer 16 temporarily.

Out of the thus obtained subbands, the wavelet transformer 14 reads out from the frame buffer 16 the image of the LL subband, which is the lowest frequency component, carries out another filtering to again divide it into another four subbands LL, HL, LH and HH, and writes them into the frame buffer 16. The filtering is performed a predetermined number of times, and the LL subband generated by the last filtering is acquired as the image closest to a DC component of the original image OI. The four subbands on the same hierarchy, namely, those obtained after the same number of filterings has been performed thereon, contain greater high-frequency components from LL to HL and LH to HH. Following these, as the images containing more of high-frequency components are the four subbands obtained by the previous filtering. In this manner, by applying repeatedly the vertical-horizontal dividing-into-four filtering to the lowest frequency component, an image formed hierarchically from low frequency components to high frequency components in a recursive vertical-horizontal dividing-into-four structure is obtained in the frame buffer 16.

The hierarchized images stored in the frame buffer 16 are read out in sequence from low to higher frequency components to the quantizer 18, where they are quantized as needed. Thereafter, quantized wavelet coefficients are decomposed, for arithmetic coding, into units called code blocks, before each of the code blocks is expressed as a bit-plane. Arithmetic coding is performed on the bit-plane, a bit stream is formed from the arithmetically coded bit string, and final coded image data CI are obtained.

The arithmetic coding used in the JPEG2000 image coding algorithm is an entropy coding. While constantly monitoring a statistical property, a coding table (hereinafter also referred to as a probability table) is optimized in association therewith, so that the coding is performed utilizing the coding table. This coding therefore can raise the compression rate higher than the usual Huffman coding. The method employed by JPEG2000 is such that, to effect such arithmetic coding, values of multiple bits obtained by quantization are decomposed into bit-planes and the values within the thus decomposed bit-planes are subjected to binary arithmetic coding.

In the arithmetic coding of bit-planes, each bit data is arithmetically coded according to a condition in its vicinity. As shown in FIG. 2, context of bit data X is determined by comparing wavelet coefficients (hereinafter also referred to as surrounding neighbor coefficients) of its vicinities D0 to D7 with the wavelet coefficient in the position of X, so that an arithmetic coding operation is performed on the bit data X according to the context by utilizing probability optimized according to the thus determined context.

Figure 4:
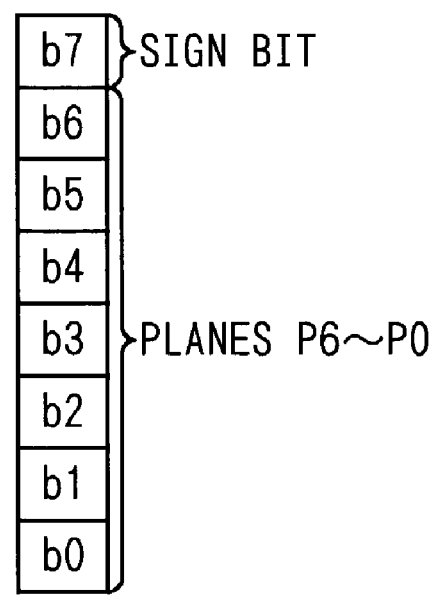
FIG. 4 illustrates a bit sequence of each of respective wavelet coefficients in the code block.

FIG. 3 shows an example of a code block to be made into a bit-plane. This example represents a code block containing 32×32 wavelet coefficients. Suppose here that the wavelet coefficient consists of eight bits, then, as shown in FIG. 4, each coefficient will contain seven bits b0 to b6 corresponding to planes P0 to P6 and one sign bit b7, and the data size will be 32×32×8=8192 bits.

The plane P6 of the 32×32 wavelet coefficients is first subjected to bit-plane coding and then to arithmetic coding. For this arithmetic coding, however, it is necessary to know a condition surrounding the bit data as shown in FIG. 2. Suppose, for instance, that four bits are required to represent the surrounding conditions, then there needs to be an additional memory of 32×32×4=4096 bits for the code block containing 32×32 wavelet coefficients.

In order to raise the speed of this JPEG2000 arithmetic coding, the present embodiment employs a parallel coding processing of a plurality of code blocks. Here, a parallelization of the coding processing of two code blocks will be described by again referring to FIG. 1.

After quantization by the quantizer 18, the wavelet coefficients of the two different code blocks are stored separately in two SRAMs 19A and 19B. The wavelet coefficients of both code blocks are read out in parallel by the two bit-plane coders 20A and 20B, the bit-plane coding is performed on both of them, and the results thereof are stored in two SRAMs 21A and 21B. Then, both the code blocks after the bit-plane coding are subjected to a parallel arithmetic coding by the two arithmetic coders 22A and 22*b*. In this manner, two each of code blocks are arithmetically coded in parallel, and the repetition of this process will eventually accomplish the arithmetic coding of all the code blocks. Then, the stream generator 24 arranges the coded data of respective code blocks, so as to generate a single bit stream.

In the above description, a structure for parallel processing, in which two code blocks are coded simultaneously, has been explained. Similarly, however, it is possible to structure a parallel processing for the coding of three or more code blocks simultaneously. For example, three each of the SRAM for storing a code block and another three each of the SRAM for bit-plane coding are prepared and, in correspondence to them, three each of the bit-plane coder and three each of the arithmetic coder are provided in parallel, so that three code blocks can be coded in parallel.

By implementing the present embodiment in this manner, code blocks are coded in parallel and thus the computation time is shortened.

Second Embodiment

Figure 5:
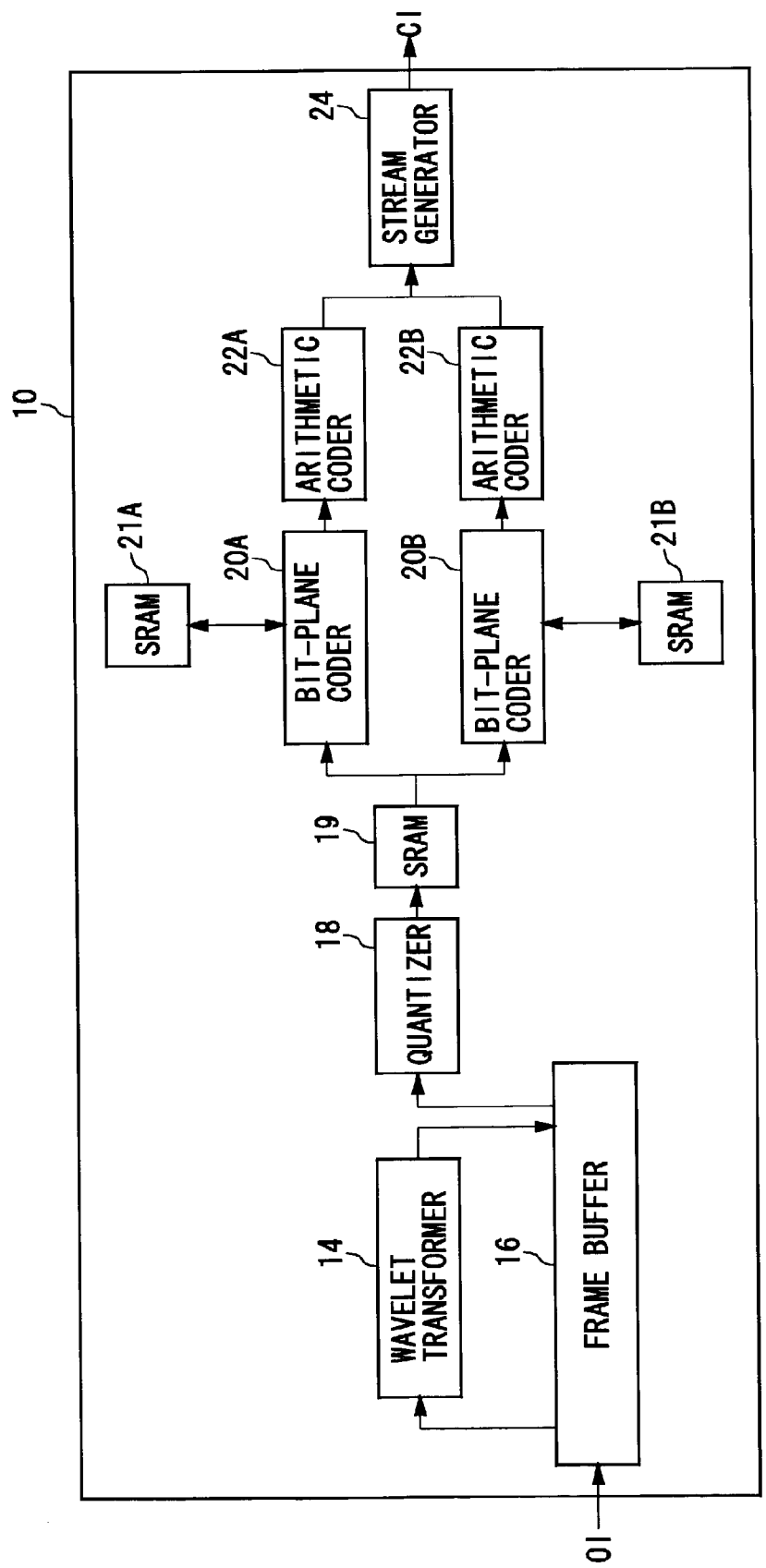
FIG. 5 is a block diagram showing a structure of an image coding apparatus according to a second embodiment of the present invention.

FIG. 5 shows a structure of an image coding apparatus 10 according to a second embodiment of the present invention. The structure and operation that differ from the first embodiment will be described hereinbelow. In this second embodiment, a single SRAM 19 is provided for use in storing a code block, and a plurality of planes are processed, in parallel, for coding a single code block. As explained with reference to FIG. 4, the code block stored in an SRAM 19 has seven planes P6 to P0. In the first embodiment, the seven planes are coded, in sequence, starting from plane P6 that corresponds to the most significant bit, but, in the second embodiment, coding is carried out by processing these planes in parallel. Here, an example will be described where the coding of two planes is parallel-processed.

Two different planes of a code block stored in the SRAM 19 are read out in parallel by two bit-plane coders 20A and 20B; a bit-plane coding is performed on each of the planes; and the results thereof are stored in two SRAMs 21A and 21B. Then, both the planes after the bit-plane coding are subjected to a parallel arithmetic coding by two arithmetic coders 22A and 22*b*. In this manner, two each of planes are arithmetic-coded in parallel, and the repetition of this process will eventually accomplish the arithmetic coding of all the seven planes, so as to obtain the coded data on the code block.

The parallelization of processings for the respective planes as described above is rather ideal to a certain degree. That is, the coding of a bit-plane in JPEG2000 is performed by actually making use of information on a higher-order bit-plane. More precisely speaking, therefore, the parallelization of coding processings for the respective planes is realized by shifting the coding processings of planes P6 to P0 in this order by a predetermined time interval and then multiplexing the thus time-shifted coding processings.

It is to be noted that in the present embodiment a structure where the coding of three or more planes is parallel-processed can of course be realized by providing three or more bit-plane coders that perform bit-plane coding for each of the three or more planes.

Accordingly, in the present embodiment, the computation time required for the coding of a single code block can be shortened by parallelizing the coding processings for the respective planes. Moreover, unlike the first embodiment, in which the coding of a plurality of code blocks is parallelized, the present embodiment requires only one SRAM 19 for use in storing code blocks, so that a memory capacity can be saved significantly and the implementation area, that is, the packaging area can be suppressed to a small size when the structure according to the present embodiment is implemented by an LSI.

In the first and the second embodiments described above, the parallel processing for bit-plane coding has been explained. According to the JPEG2000 specifications, each bit-plane data within a code block is coded in a manner such that the each bit-pane data is divided into three passes, namely, s pass, r pass and c pass. In the following third to sixth embodiments, the parallel processing for the bitplane coding including the dividing into the passes will be described.

Prior to the description of the third to sixth embodiments, it is to be noted that in JPEG2000 there are two computation methods of arithmetic coding for each pass. That is, JPEG2000 provides one computation method, in which at the end of arithmetic coding for each coding pass, the arithmetic coding data are flushed and the parameters are reset in preparation for the next coding, and the other, in which the arithmetic coding data for each coding pass are not flushed and the parameters are retained for the next coding, and either method is selectable.

The third and fourth embodiments represent the case where the result of previous pass processing is not taken over to the coding of the next pass, so that there is, of course, no effects of a pass processing across the bitplanes. In the third and fourth embodiments, therefore, a pass processing can be performed independently for each bitplane.

On the other hand, the fifth and sixth embodiments represent the case where the result of previous pass processing is taken over to the coding of the next pass, so that even at a break of bit-planes, the result of pass processing at a higher-order plane affects the pass processing at the lower-order plane. As an inevitable consequence, therefore, pass processing can not be done separately for each bit-plane. Thus, in the fifth and sixth embodiments, the bit-plane data are read out, in sequence, starting with a high-order plane, and the pass processing of an applicable bit-plane is carried out while utilizing the result of pass processing in the previous bit-plane.

Hereinbelow, the third to sixth embodiments will be described based on the understanding of the above-mentioned difference resulting from whether the result of previous processing is used in subsequent pass computation or not.

Third Embodiment

Figure 6:
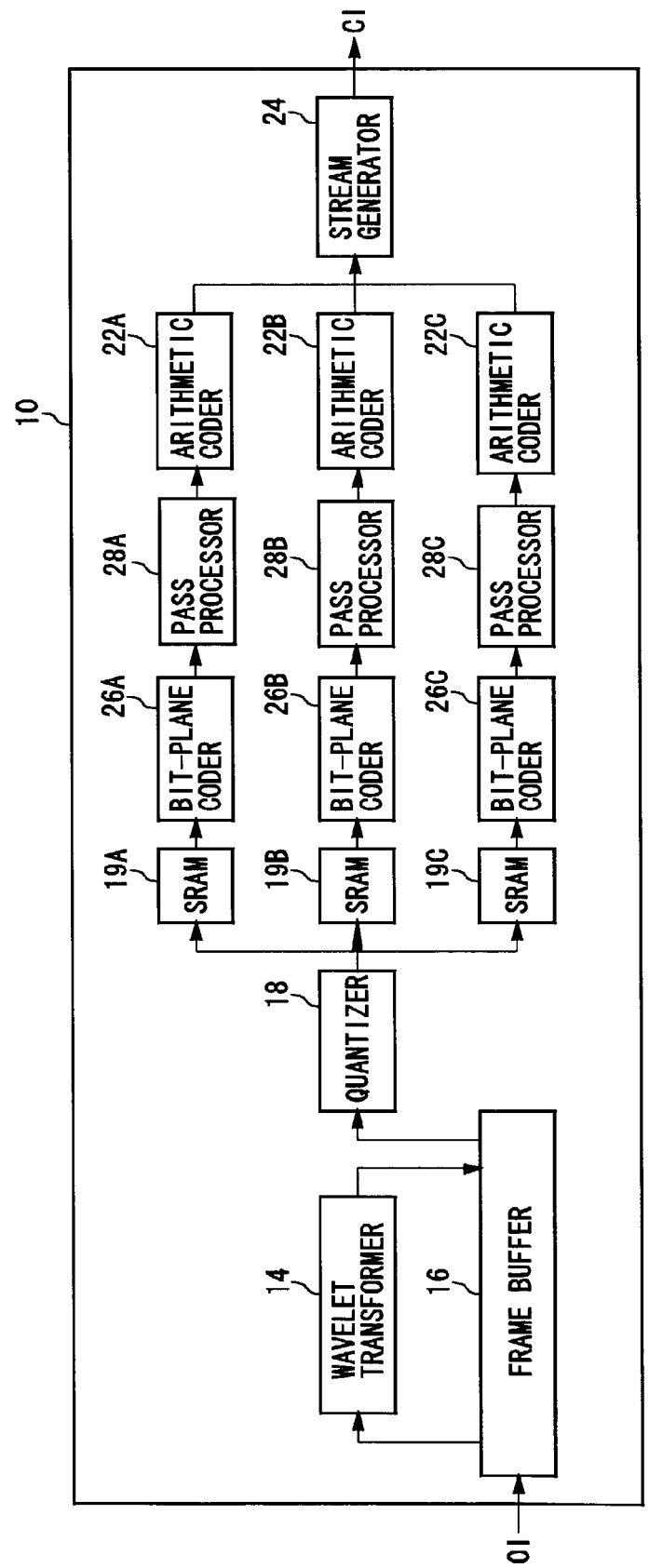
FIG. 6 is a block diagram showing a structure of an image coding apparatus according to a third embodiment of the present invention.

FIG. 6 shows a structure of an image coding apparatus 10 according to a third embodiment of the present invention. In this third embodiment, similar to the first embodiment, the coding processings of a plurality of code blocks are performed in parallel, but this parallel processing is performed together with a processing of dividing into passes in bit-plane coding (which will be described later). Here, a parallelization of coding processing of three code blocks will be described, in which the description of the structure and operation common to the first embodiment is omitted.

The wavelet coefficients of the three different code blocks are stored in three SRAMs 19A, 19B and 19C. The wavelet coefficients of the respective code blocks are read out in parallel by three bit-plane processors 26A, 26B and 26C, where each wavelet coefficient is separated into a sign bit and an absolute value thereof, and the absolute value is converted to a binary bit-plane expression. Each bit-plane is divided into horizontally long stripes of height 4, for instance, for coding, and the stripes are processed in sequence from the top. From left top, each stripe is scanned zigzag vertically until it reaches right bottom, where the processing moves on to the next stripe. The time for coding can be shortened by the scanning after this division into stripes of a predetermined height because this way the information on the surrounding conditions can be obtained quickly in the pass processing (described later).

The scanned data on the bit-planes of the three code blocks are respectively supplied to three pass processors 28A, 28B and 28C, where contexts to be used in division to coding passes and arithmetic coding are generated in parallel.

The processing of division to passes at each of the pass processors 28A, 28B and 28C will be described. The division to passes is done by referring to the significant/insignificant information on the coefficient X and the surrounding neighbor coefficients D0 to D7 positioned in the vicinity of said coefficient X, as shown in FIG. 2. Here, an insignificant coefficient is a coefficient for which 1 has not yet occurred at its higher-order bits, whereas a significant coefficient is one for which 1 has already occurred at its higher-order bits. This significant/insignificant information will be updated every time a coefficient is coded.

In an s pass, an insignificant coefficient which has one or more significant coefficients among its eight surrounding neighbor coefficients is coded. This is because the effect on the image quality is considered great when the transition is made from insignificant to significant. In an r pass, a coefficient which is already identified as a significant coefficient by the coding at a higher plane is coded. In a c pass, an insignificant coefficient which has not been coded in the s pass is coded.

Figure 7:
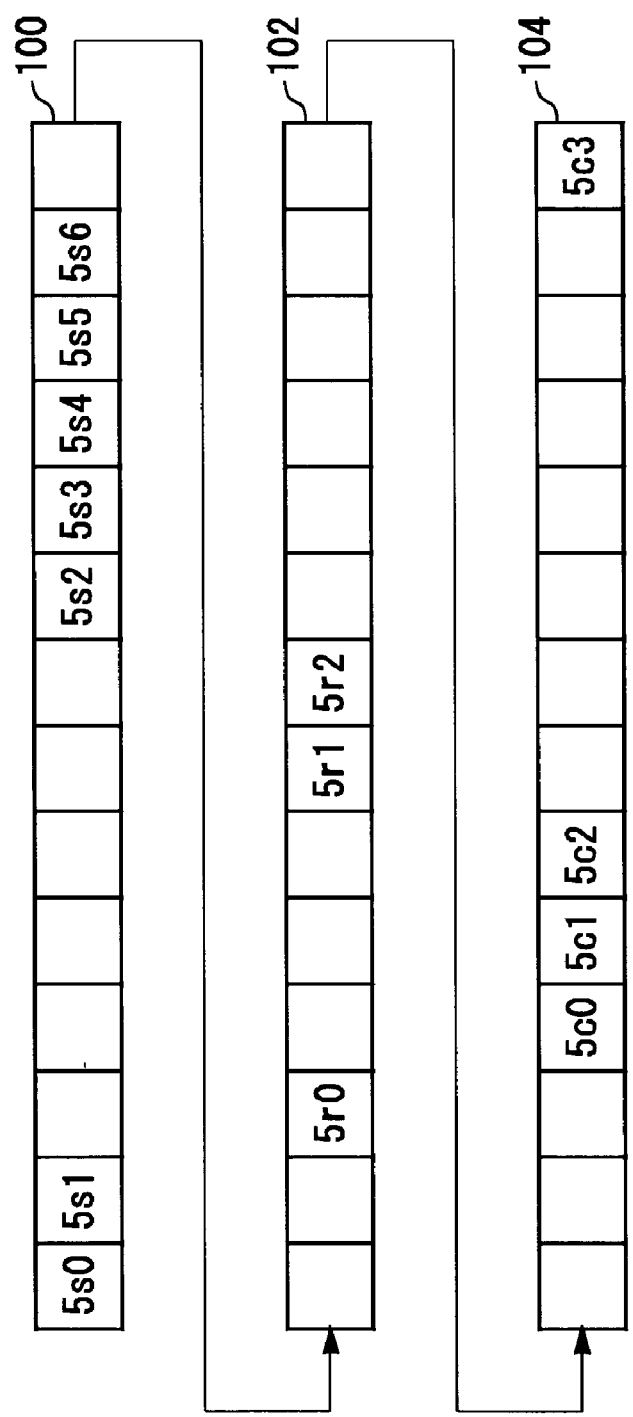
FIG. 7 illustrates how each coefficient of a code block is divided into passes.

FIG. 7 shows an example where the above-mentioned stripes in a code block are scanned and then allotted to any of the s, r and c passes. Shown here, as an example of division of a stripe of plane P5 into passes, are series 100, 102 and 104 of the coefficients of the stripe scanned in the order of s pass, r pass and c pass processing. In this manner, the stripe is scanned three times in correspondence to the three types of passes. In the first scanning, whether each coefficient belongs to the s pass or not is judged. At this stage, the coefficients $5s0, 5s1, \ldots, 5s6$ classified into the s pass are obtained. Then, in the second scanning, whether each coefficient belongs to the r pass or not is judged. At this stage, the coefficients $5r0, 5r1$, and $5r2$ classified into the r pass are obtained. Likewise, in the third scanning, the coefficients $5c0, 5c1, 5c2$ and $5c3$ classified into the c pass are obtained.

After the plane P5 is divided into the s pass, r pass and c pass in the manner described above, division into the three types of passes is carried out for the next plane P4. When the division into the three types of passes is finished with all the planes finally, the arithmetic coding of bitplanes is performed on each plane by each pass.

In the pass processing, not only the division into passes but also formation of contexts to be used in arithmetic coding is carried out. The context formation will be described briefly below. In context formation, too, reference is made to the significant/insignificant information on the coefficient X in question and the surrounding neighbor coefficients D0 to D7 positioned in the vicinity of said coefficient X, as shown in FIG. 2.

The context formation is done at each of the passes. At the s pass, the significant/insignificant information on the eight surrounding neighbor coefficients is generated in a manner that it is degenerated to nine kinds of contexts. In the r pass, three kinds of contexts are generated depending on whether or not a coefficient classified into the r pass is classified into the r pass for the first time at this plane, and also depending on how many of the eight surrounding neighbor coefficients are significant coefficients. In the c pass, the same contexts as with the s pass are generated. In this manner, the arithmetic coding based on predicted values is carried out using the contexts thus formed at each pass.

Fourth Embodiment

Figure 8:
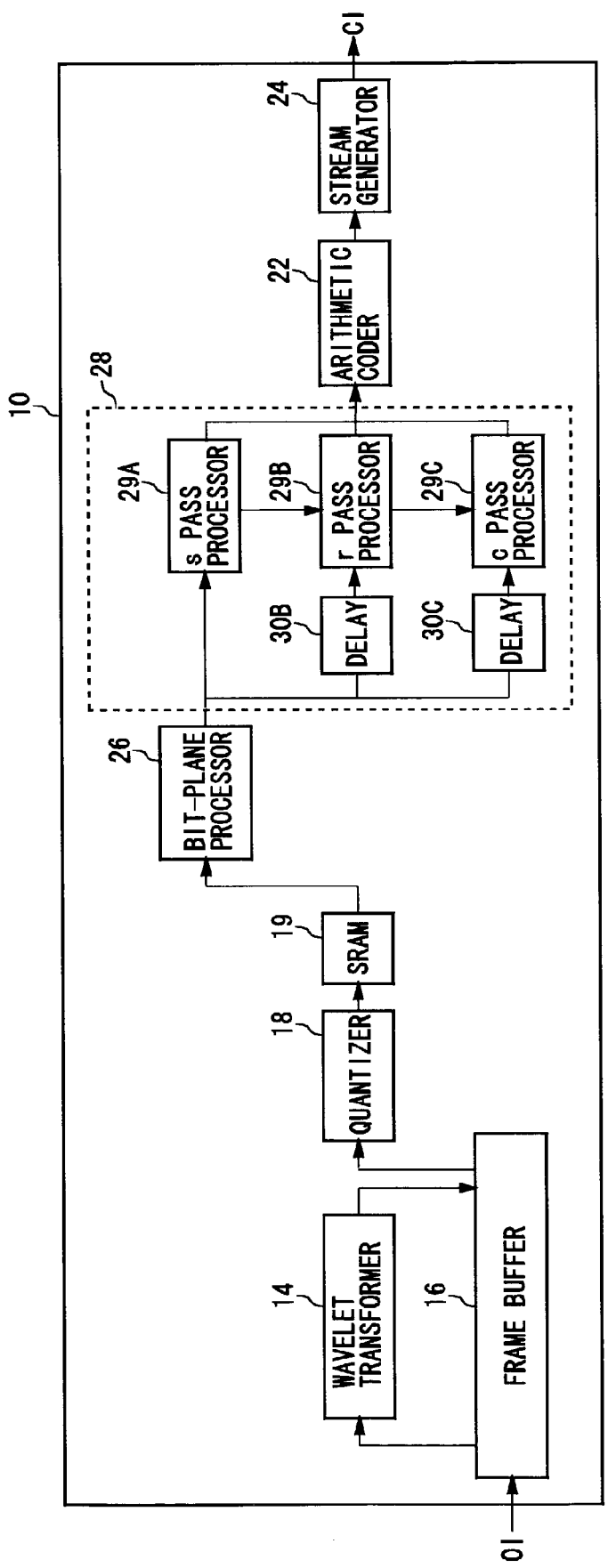
FIG. 8 is a block diagram showing a structure of an image coding apparatus according to a fourth embodiment of the present invention.

FIG. 8 shows a structure of an image coding apparatus 10 according to a fourth embodiment of the present invention. In the fourth embodiment, similar to the second embodiment, there is provided a single SRAM 19 for use in storing the code block, so as to code a single code block. However, the parallel processing is performed not on the bit-planes but on three-way pass processings for s pass, r pass and c pass. Description as to the division into passes and context formation, which have been described in the third embodiment, is omitted here. Moreover, the components with the same reference numerals are the same as have been described.

The coefficients of a code block read out from an SRAM 19 by a bit-plane processor 26 are made into bit-planes and then supplied to a pass processor 28. The pass processor 28, which includes an s pass processor 29A, an r pass processor 29B and a c pass processor 29C, is so structured that processing at each of the passes can be executed in parallel.

In the division into passes as described in the third embodiment, scanning is done in the order of s pass, r pass and c pass and reference is made to a classified result in the previous pass. Normally, therefore, the s pass processing is to be followed by the r pass processing, which is to be followed by the c pass processing. Yet, information required in the classifying into the passes of the coefficients of the code block is limited to information on the surrounding neighbor coefficients, so that it is not of property that the processing of a subsequent pass cannot be performed until the processing of the previous pass is completed. Thus, in the present embodiment, the processings of s pass, r pass and c pass are parallelized as described hereinbelow.

The s pass processor 29A, the r pass processor 29B and the c pass processor 29C are special-purpose processors that are specialized in processing the division to their respective passes. All of them receive bit-plane data supplied from the bit-plane processor 26, but the start of their processing is sequentially delayed by, for example, two unit times, by two delay units 30B and 30C. By the operation of the first delay unit 30B, the r pass processor 29B carries out a pass processing for the data that have been processed two unit times before by the s pass processor 29A. By the operation of the second delay unit 30C, the c pass processor 29C carries out a pass processing for the data that have been processed two unit times before by the r pass processor 29B.

Figure 9:
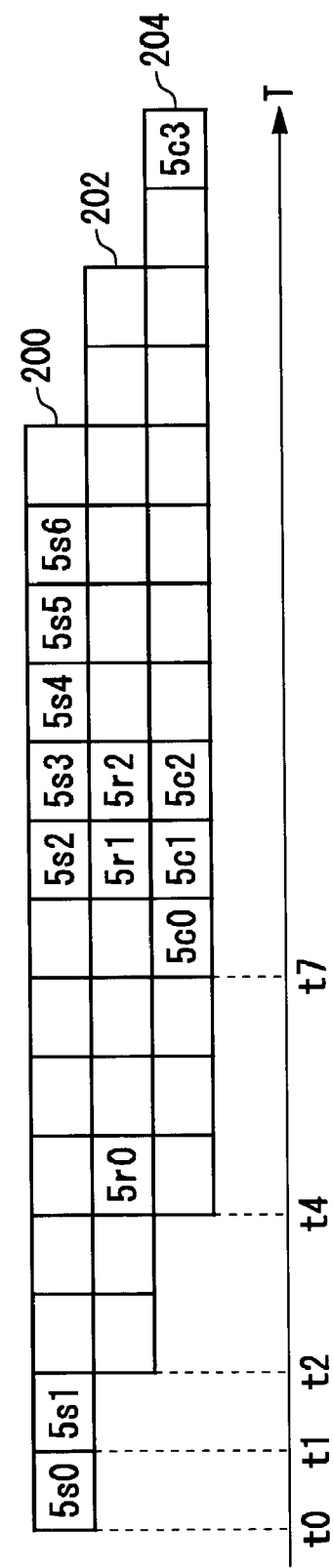
FIG. 9 illustrates how each coefficient of a code block is divided, in parallel, into passes.

Parallelized pass processings according to the present embodiment will be described using the example of pass processing of plane P5 in FIG. 7 described in the third embodiment. FIG. 9 shows a state of parallel pass classifying by the s pass processor 29A, the r pass processor 29B and the c pass processor 29C. The horizontal axis represents time T. At time t0, the pass classifying by the s pass processor 29A starts for the series of scanned coefficients of a code block. Two unit times later, or at time t2, the pass classifying by the r pass processor 29B starts for the same series of coefficients. Another two unit times later, or at time t4, the pass classifying by the c pass processor 29C starts.

Shown in FIG. 9 are classifying results 200, 202 and 204 for the series of coefficients by the respective pass processors. At time t2, the r pass processor 29B can utilize the results 5s0 and 5s1 of the first two coefficients classified by the s pass processor 29A two unit times before and, in this case, skips the processing without performing it because the first two are classified into the s pass. At time t4, the r pass processor 29B classifies the third coefficient into the r pass. Similarly, the c pass processor 29C can utilize the classifying of the first three coefficients into the s pass or the r pass, and finally at time t7, carries out the classifying into c pass for the first time.

Thus, in the present embodiment, the classifying of three passes is done in parallel, despite the time lag of two unit time each, so that the pass classifying can be processed nearly three times faster than that of the third embodiment. It is to be noted also that context formation in each pass, which is done simultaneously with the pass classifying, is processed in parallel.

In the present embodiment, the computation time required in the coding of a code block can be shortened by operating the special-purpose processors in parallel for their respective passes. Moreover, in this fourth embodiment, unlike the case of the third embodiment where the whole processing that codes code blocks is parallelized by providing a plurality of memories for use in storing the code blocks, only one memory for use in storing a code block is provided and the internal operation of the pass processing for a single code block is parallelized. Hence, the computation time can be shortened while the memory size is suppressed to the minimum.

Fifth Embodiment

Figure 10:
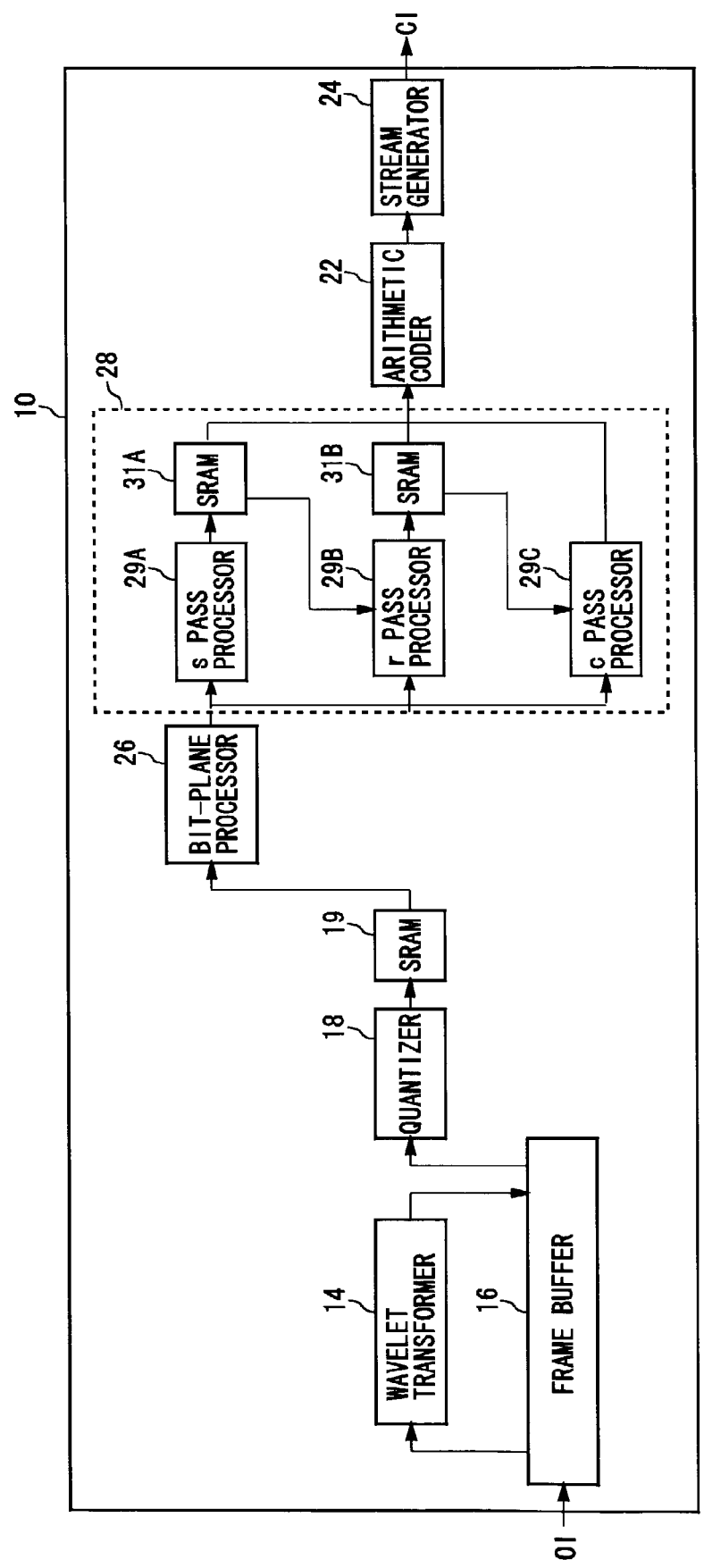
FIG. 10 is a block diagram showing a structure of an image coding apparatus according to a fifth embodiment of the present invention.

FIG. 10 shows a structure of an image coding apparatus 10 according to a fifth embodiment of the present invention. The fifth embodiment differs in structure and operation from the fourth embodiment in that a pass processor 28 takes over a processing result between the pass processings of s pass, r pass and c pass.

The pass processor 28 includes an s pass processor 29A, an r pass processor 29B, a c pass processor 29C, an SRAM 31A that stores a processing result of the s pass processor 29A and an SRAM 31B that stores a processing result of the r pass processor 29B. The r pass processor 29B utilizes the processing result of the s pass processor 29A stored in the SRAM 31A, whereas the c pass processor 29C utilizes the processing result of the r pass processor 29B stored in the SRAM 31B.

Figure 11C:
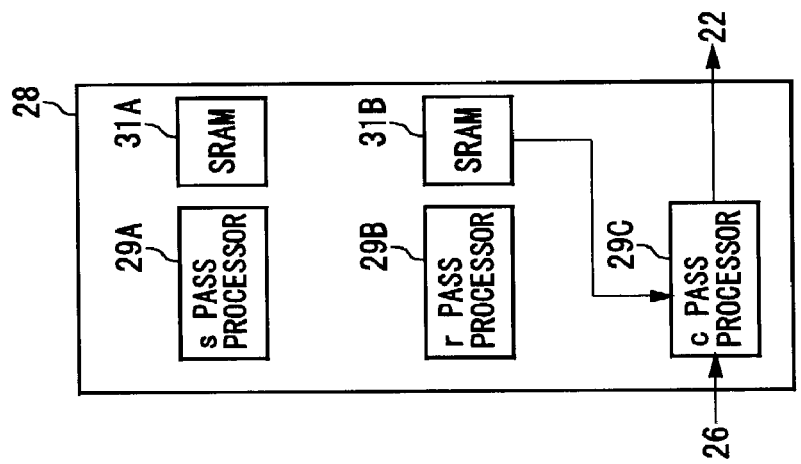
FIGS. 11A, 11B and 11C illustrate operations of the pass processor shown in FIG. 10.
Figure 11B:
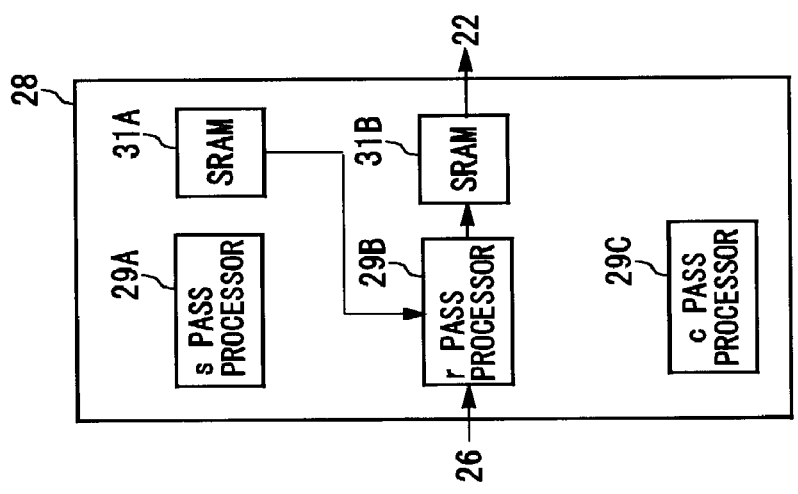
Figure 11A:
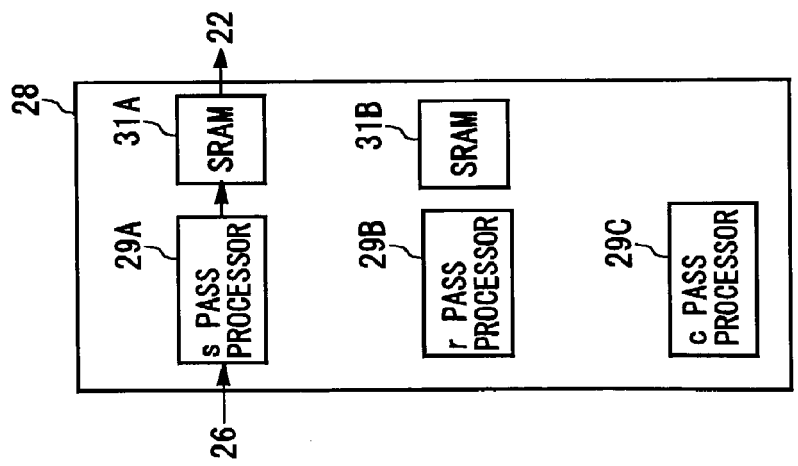

Referring to FIGS. 11A, 11B and 11C, operations of the pass processor 28 will be described. FIG. 11A shows a processing operation of the c pass. The s pass processor 29A judges whether bit data supplied from the bit-plane processor 26 belongs to the s pass or not, based on the surrounding bit data and information on the other planes. The s pass processor 29A also stores the bit data judged to belong to the s pass and the information on the context for selecting the probability table into the first SRAM 31A. The arithmetic coder 22 performs arithmetic coding, utilizing the bit data and context stored in the first SRAM 31A.

FIG. 11B shows a processing operation of the r pass. The r pass processor 29B computes the context and so forth, utilizing the processing result of s pass stored in the first SRAM 31A. The r pass processor 29B judges whether the bit data supplied from the bit-plane processor 26 belongs to the r pass or not, based on the surrounding bit data and the information on the other planes, and then stores the bit data judged to belong to the r pass and the information on the context for selecting the probability table into the second SRAM 31B.

FIG. 11C shows a processing operation of the c pass. The c pass processor 29C utilizes, in a similar manner, the processing result of r pass stored in the second SRAM 31b, judges whether the bit data belongs to the c pass or not, based on the surrounding bit data and the information on the other planes, and outputs the bit data judged to belong to the c pass and the information on the context for selecting the probability table.

According to the fifth embodiment, a pass processing that requires the taking-over of the processing result of the other pass can be performed by storing the context in memory temporarily and referring to the contents thereof. Thus, in the processing of the r pass, for instance, there is no need for repeating the computation of s pass to obtain the processing result of the s pass, so that computation time therefor is saved and the processing operation of the pass processor 28 is simplified.

Sixth Embodiment

Similar to the fifth embodiment, processing results between the pass processings are handed over in a sixth embodiment, too. An image coding apparatus according to the sixth embodiment has the same structure as the image coding apparatus 10 according to the fourth embodiment shown in FIG. 8, but differs in a pass processing operation at the pass processor 28.

Figure 12C:
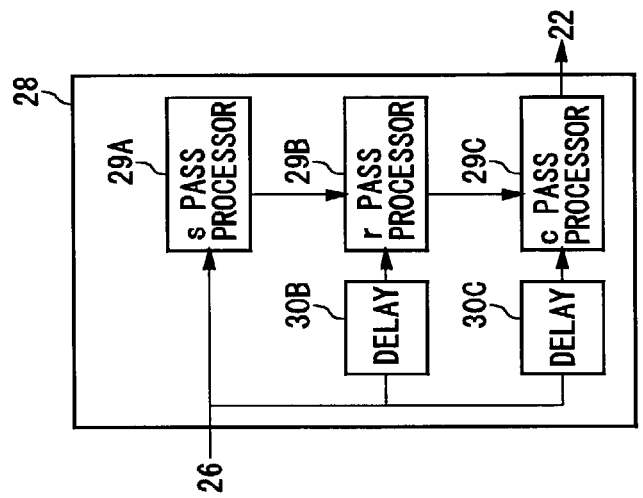
FIGS. 12A, 12B and 12C illustrate operations of the pass processor in a sixth embodiment of the present invention.
Figure 12B:
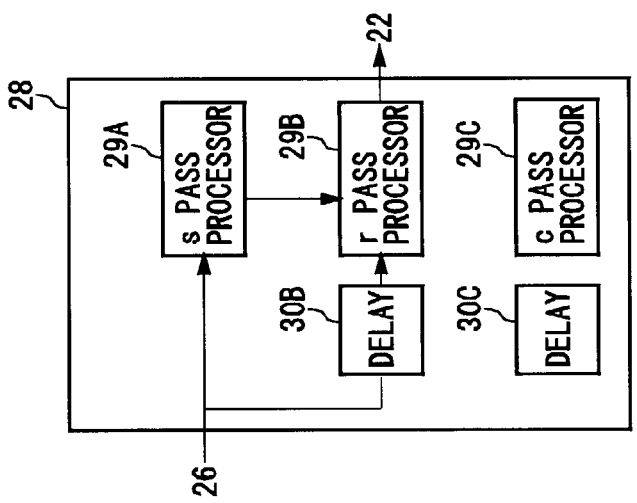
Figure 12A:
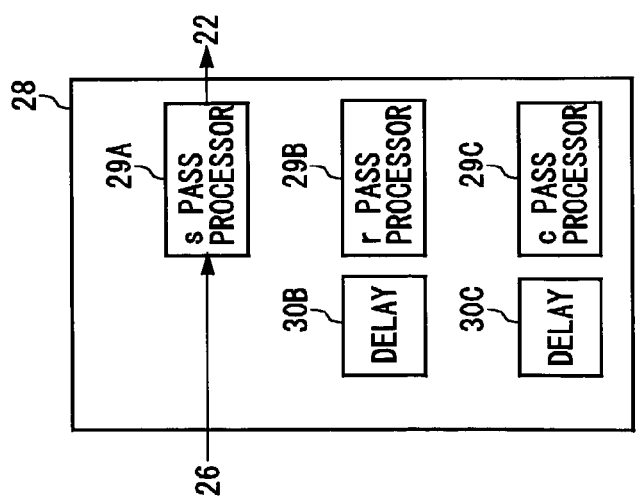

Referring to FIGS. 12A, 12B and 12C, operations of the pass processor 28 will be described. FIG. 12A shows a processing operation of the s pass. The s pass processor 29A judges whether the bit data supplied from the bit-plane processor 26 belongs to the s pass or not, based on surrounding bit data and information on other planes. The s pass processor 29A also outputs the bit data judged to belong to the s pass and the information on the context for selecting the probability table. The arithmetic coder 22 performs arithmetic coding using the bit data and context thus outputted.

FIG. 12B shows a processing operation of the r pass. The bit data supplied from the bit-plane processor 26 are first inputted to the s pass processor 29A, where an s pass processing is performed again, and a processing result thereof is inputted to the r pass processor 29B. The r pass processor 29B, by operation of the first delay unit 30B, receives bit data after completion of the recomputation by the s pass processor 29A, and carries out an r pass processing using the processing results of s pass inputted from the s pass processor 29A.

FIG. 12C shows a processing operation of the c pass. Prior to the processing of c pass, recomputation of s pass and recomputation of r pass are performed in sequence. Namely, recomputation of s pass is performed at the s pass processor 29A, and based on its result, recomputation of r pass is performed at the r pass processor 29B. Then, a result of recomputation of r pass is sent to the c pass processor 29c, and, by operation of the second delay unit 30C, a c pass processing based on the processing result of r pass is performed at the c pass processor 29C and its result is outputted.

According to the present embodiment, the special-purpose processor for a preceding pass is utilized in the processing of the subsequent pass, so that there is no need for storing the processing results of a preceding pass in memory. While the computation time becomes longer because of the repetition of computation of the preceding pass, the absence of memory can suppress the packaging area of the pass processor 28 to the minimum and reduce the packaging cost.

The present invention has been described based on embodiments which are only exemplary. It is understood by those skilled in the art that there exist other various modifications to the combination of each component and each processing described and that such modifications are encompassed by the scope of the present invention. Such modifications will be described hereinbelow.

For example, selecting to adopt either the computation time shortening type design as in the fifth embodiment or the memory saving type design as in the sixth embodiment is made and determined in consideration of a variety of requirements, such as the required speed of coding, the packaging scale of circuit and the power consumption. Thus, a great variety of modifications and combinations are conceivable in the design.

In the above description, the preferred embodiments have been explained using the JPEG2000 coding algorithm as an example. However, the parallel coding processing according to the present invention may be applied to other image coding algorithms such as JPEG and MPEG as well.

Hence, implementing the present embodiments provides a further efficient image coding processing.

Although the present invention has been described by way of exemplary embodiments, it should be understood that many changes and substitutions may be made by those skilled in the art without departing from the scope of the present invention which is defined by the appended claims.

What is claimed is:

1. An image coding apparatus, comprising:
    a single bit-plane unit which reads out image data by slicing the image data for each bit-plane;
    a plurality of special-purpose dividing units which classify bit-plane data read out by said bit-plane unit into different groups that said dividing units take charge of, according to predetermined properties, and then perform thereon preprocessings for coding; and
    a coder which integrates data obtained as results of the preprocessings by said plurality of special-purpose dividing units and then codes the integrated data.

2. An image coding apparatus according to claim 1, wherein the preprocessings by said plurality of special-purpose dividing units are executed in parallel while a time lag is kept to a degree that cross-referencing necessary among the results of the preprocessings is made.

3. An image coding apparatus according to claim 1, wherein the preprocessing is a processing which specifies a predicted value of a next bit to be coded, and said coder performs arithmetic coding on the image data based on the predicted value.

4. An image coding apparatus according to claim 2, wherein the preprocessing is a processing which specifies a predicted value of a next bit to be coded, and said coder performs arithmetic coding on the image data based on the predicted value.

5. An image coding apparatus according to claim 1, wherein the different groups are classified from a viewpoint of how the respective different groups affect a change of the predicted value.

6. An image coding apparatus, comprising:
    a converter which converts image data to data on a spatial frequency;
    a quantizer which quantizes data that have been converted by said converter;
    a bit-plane unit which reads out data that have been quantized by said quantizer, by slicing the quantized data for each bit-plane;
    a plurality of special-purpose dividing units which classify bit-plane data read out by said bit-plane unit, into different groups that said dividing units take charge of, according to predetermined properties, and then perform thereon preprocessings for coding;
    a coder which integrates data obtained by as results of the preprocessings by said plurality of special-purpose dividing units and then codes the integrated data; and
    a stream generator which integrates data that have been coded by said coder, so as to generate a coded stream.

7. An image coding apparatus according to claim 1, wherein, in compliance with JPEG2000 specifications, said plurality of exclusive-use dividing units divide, in parallel, the respective bit plane data into data of different passes.

8. An image coding apparatus according to claim 6, wherein said plurality of special-purpose dividing units divide, in parallel, the respective bit plane data into data of different passes, in compliance with JPEG2000 specifications.

9. An image coding apparatus according to claim 1, wherein said plurality of special-purpose dividing units include at least first and second special-purpose dividing units which take charge of first and second groups, respectively, and wherein data of each bit-plane are processed in a manner that at a first-time scan operation the first group is first extracted by said first special-purpose dividing unit, and, at a second-time scan operation, data judged not to belong to the first group by said first special-purpose dividing unit are inputted to said second special-purpose dividing unit and the second group is extracted.

10. An image coding apparatus according to claim 9, wherein said first and second special-purpose dividing units extract data of different passes from the data of each bit-plane in compliance with JPEG2000 specifications, and a processing of said second special-purpose dividing unit is started as soon as a result of a processing of said first special-purpose dividing unit is taken over to said second special-purpose dividing unit.

11. An image coding apparatus according to claim 1, wherein said plurality of special-purpose dividing units include at least first and second special-purpose dividing units which take charge of first and second groups, respectively, and wherein data of each bit-plane are processed in a manner that at a first-time scan operation the first group is first extracted by said first special-purpose dividing unit, and at the same time a data position of at least the first group is recorded and at a second-time scan operation said second special-purpose dividing unit extracts the second group by referring to the recorded data.

* * * * *